Figure 1:
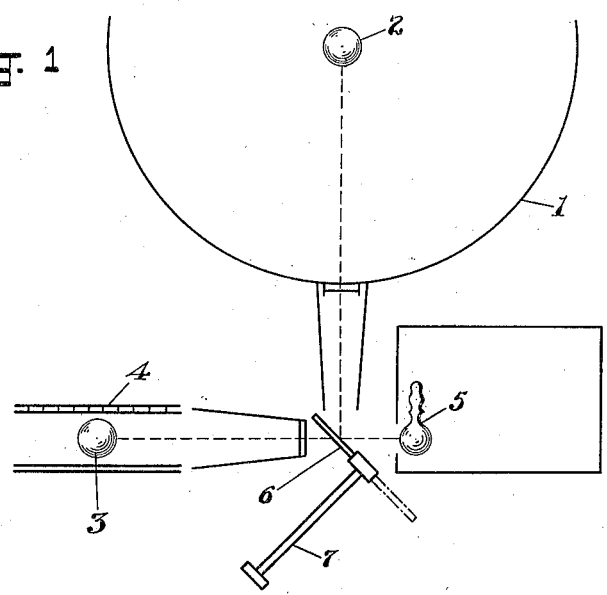

Aug. 27, 1929.

C. H. SHARP ET AL 1,726,318

PHOTO ELECTRIC PHOTOMETER

Filed Aug. 15, 1925      2 Sheets-Sheet 1

INVENTOR
Clayton H. Sharp, Carl Kinsley & Edgar D. Tirrill
BY
Frank L. Dyer
ATTORNEY Aug. 27, 1929.   C. H. SHARP ET AL   1,726,318
PHOTO ELECTRIC PHOTOMETER
Filed Aug. 15, 1925    2 Sheets-Sheet 2

INVENTOR
Clayton H. Sharp, Carl Kinsley & Edgar D. Doyle
BY
Frank L. Dyer
ATTORNEY Patented Aug. 27, 1929.

1,726,318

UNITED STATES PATENT OFFICE.

CLAYTON H. SHARP, OF WHITE PLAINS, CARL KINSLEY, OF SCARSDALE, AND EDGAR D. DOYLE, OF PLEASANTVILLE, NEW YORK.

PHOTO-ELECTRIC PHOTOMETER.

Application filed August 15, 1925. Serial No. 50,530.

Our invention relates to an improved photometer in which the candle power is determined by means of a photoelectric cell instead of by the eye as with the usual practice. In this way the personal equation is entirely eliminated and great accuracy can be secured. At the same time the operation of photometering lamps can be performed more rapidly than by the use of ordinary standard photometers.

The object of our invention is to provide a photoelectric photometer of rugged and sturdy construction, and which does not employ highly sensitive laboratory apparatus, whereby the device may be operated under commercial conditions without the need of highly trained labor. The apparatus is however extremely accurate and capable of rapid operation.

A further object is to provide a photometer in which the results are read directly from a scale without troublesome computations and readjustments.

In carrying our invention into effect we make use of any suitable photoelectric cell, the resistance of which changes under the influence of light, and we subject this cell alternately to the light from the lamp whose candle power is to be determined as well as from a standard calibrated comparison lamp, one of which lamps is movable back and forth with respect to the photoelectric cell and with respect to a suitable scale giving the desired readings in candle power. By means of suitable appliances we cause a galvanometer or other suitable indicating instrument to be operated by electric currents, the values of which are determined by the light from the two lamps, so that by moving either lamp, preferably the comparison lamp, with respect to the scale the candle power of the lamp being metered will be determined when the respective currents are in balance and a zero reading of the galvanometer is effected.

Figure 2:
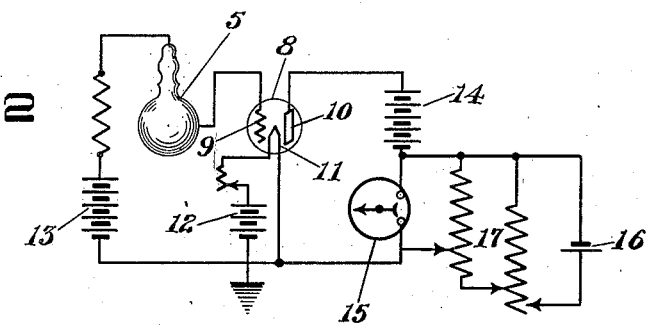
Figure 3:
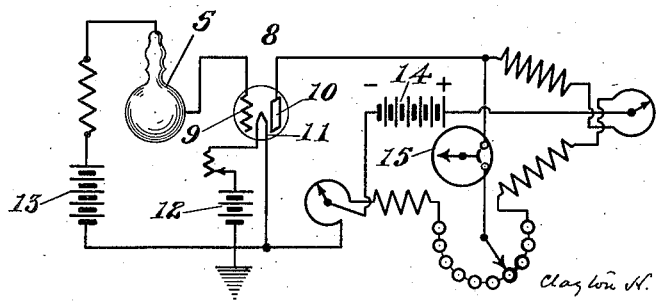
Figure 4:
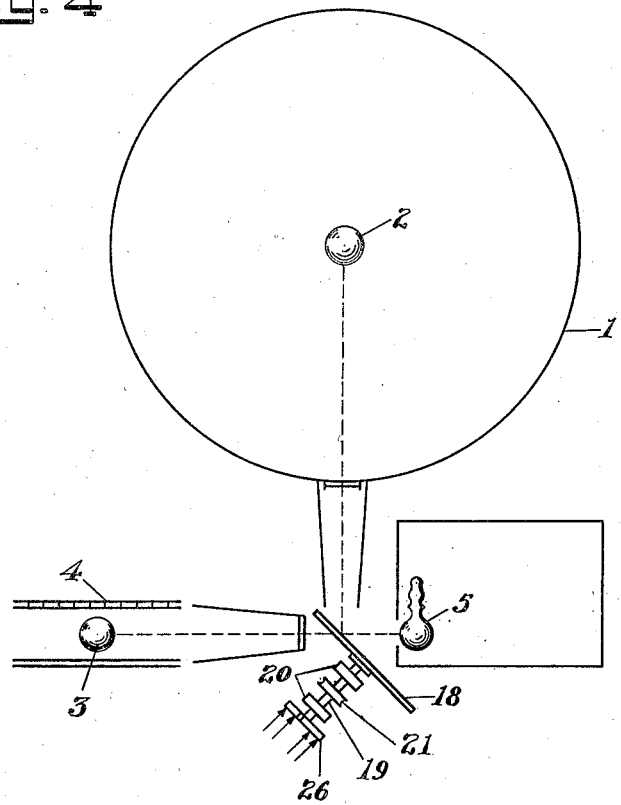
Figure 5:
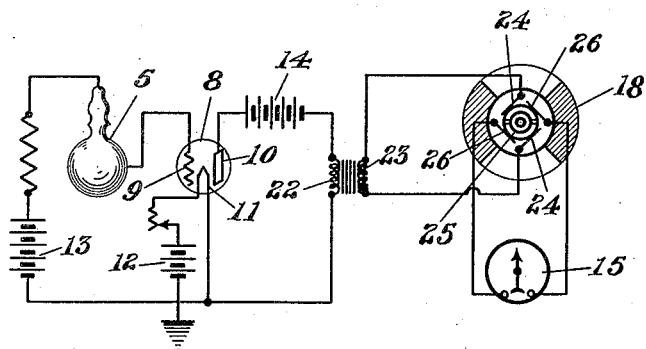

The currents which can be caused to flow in an ordinary photoelectric cell under the influence of even a relatively large illumination (for example, one foot-candle) is extremely small even when the voltage applied to the cell is large, and it is at best only a small fraction of a microampere. To read currents of these values directly would involve the use of highly sensitive and delicate galvanometers which would be quite out of the question for commercial practice on a large scale. We find however that by employing an amplifying tube, such as a three-electrode audion, it becomes possible to secure relatively large currents in the plate circuit due to the voltage variations impressed upon the grid by the photoelectric cell, whereby a relatively insensitive but accurate galvanometer may be employed with the apparatus to indicate the condition of electric balance. If it were attempted to operate a photometer with two photoelectric cells, one for the lamp which is being metered and the other for the comparison lamp, it would be necessary to select two cells having the same electrical characteristics, but by making use of a single photoelectric cell acted upon alternately by the light from the two lamps this is not necessary, and any standard cell may therefore be used since it is only necessary that a condition of electric balance shall be indicated by the galvanometer when the movable lamp is at position on its scale to indicate the candle power. We have worked out a number of possible electric circuits which may be utilized in carrying our invention into effect, some of which are illustrated in the accompanying drawings forming a part of this specification and in which:

Fig. 1 is a diagrammatic view of a suitable photometric apparatus;

Fig. 2, a corresponding view of a simple circuit arrangement in which the balancing of the galvanometer is effected by means of a potentiometer;

Fig. 3, a similar view showing a different circuit arrangement in which the balancing of the galvanometer is effected by means of a Wheatstone bridge;

Fig. 4, a similar view showing the preferred arrangement in which the electric balance of the galvanometer is effected automatically instead of manually as with the arrangements of Figs. 1, 2 and 3; and Fig. 5, a similar view showing the circuit arrangement employed with the apparatus of Fig. 4, and illustrating also the commutator of that figure in section.

In all of the above views corresponding parts are represented by the same numerals of reference.

Referring first to Fig. 1, we show the usual hollow sphere 1 in which is placed the lamp 2, the candle power of which is to be determined. 3 represents the standard or comparison lamp of known candle power, which as usual is movable back and forth in suitable guide ways with reference to a scale 4 indicating candle power. 5 represents the photoelectric cell of any suitable type which is arranged to be acted upon alternately by the light from the lamp 2 or from the standard comparison lamp 3. To this end we show a mirror 6 mounted on a suitable shaft 7, which mirror when in the full line position will reflect light from the lamp 2 upon the photoelectric cell 5, and when moved to the dotted line position will permit light from the comparison lamp 3 to influence the said cell.

Referring now to Fig. 2, we show at 8 the conventional representation of a thermionic vacuum tube having a grid 9, plate 10 and filament 11 and with the usual A battery 12 for lighting the filament. The photoelectric cell 5 is connected in the grid circuit of this tube and is in series with a battery 13 of relatively high voltage, for example, 100 volts. The B battery 14 of the cell is in the plate circuit in the usual way and includes a galvanometer 15, preferably one having a short period and critically damped so as to be insensitive to vibrations. Shunted around the galvanometer 15 is a battery 16 with potentiometer 17 by which the battery voltage may be accurately controlled. In operating such an apparatus the mirror 6 occupies the position shown in full lines whereby the light from the lamp 2 will influence the photoelectric cell 5. The resulting voltage variation in the grid circuit effects the current flow in the plate circuit and the consequent deflection of the galvanometer 15. By means of the potentiometer 17 the galvanometer 15 is brought to zero. The mirror 6 is now moved to the dotted line position shown in Fig. 1, so that light from the standard comparison lamp 3 will influence the cell 5 and this lamp 3 is then moved to a position on the scale 4, where the galvanometer will again read zero. This position of the standard lamp with reference to the scale will be a direct reading of the candle power of the lamp 2. In Fig. 3 another circuit arrangement is shown where a Wheatstone bridge is used. With this circuit the B battery 14 is connected across the bridge and serves as a bridge battery thus doing away with the separate potentiometer battery 16 as with the arrangement of Fig. 2. The galvanometer 15 is connected across the other diagonal of the bridge and resistances of the bridge are made adjustable, the moving contacts being placed either in the battery circuit or in the galvanometer circuit so that any variable contacts which they might have cannot affect the balance of the bridge. As with Fig. 2, one lead from the photoelectric cell is brought to the grid and the other to the filament of the amplifier. When the photoelectric cell is excited the grid potential of the amplifier is altered and a corresponding change in the apparent resistance of the filament-plate portion of the circuit occurs. The operation of the arrangement shown in Fig. 3 is the same as in Fig. 2, except that the balancing or zeroizing of the galvanometer is effected by means of the bridge contacts instead of by a separate potentiometer. As with Fig. 2, the lamp 2 which is to be metered is first made to influence the cell 5 after which the galvanometer 15 is brought to zero and then the comparison lamp 3 is made to influence the cell, being moved with respect to the scale 4 which will indicate the candle power of the lamp 2 when the galvanometer 15 again reads zero.

With the arrangements above described manual manipulation of the mirror 6 and manual adjustment to secure the balance of the galvanometer are necessary. A preferable arrangement is shown in Figs. 4 and 5 where these manipulations are not employed, the only thing required being to move the comparison lamp to the desired position with reference to the scale 4. With this arrangement we show the same hollow sphere 1 for containing the lamp 2 which is to be metered, the same comparison lamp 3 movable with respect to the scale 4, and the same photoelectric cell 5. Here, however, instead of a mirror 6 we employ a disc 18, one half of which is silvered so as to reflect light from the lamp 2 on to the cell 5 and the other half of which is clear so as to permit passage of light directly from the comparison lamp 3 to the cell 5. The disc 18 is mounted on a shaft 19 in suitable bearings 20 and is driven rapidly in any suitable way as for instance by a pulley 21. Thus the disc in rotating will alternately cause the cell 5 to be influenced by light from the lamps 2 and 3 respectively.

Referring to Fig. 5 illustrating the circuit arrangements, the three-electrode tube 8 has its grid circuit connected in series with the cell 5 and battery 13 as with the arrangements of Figs. 2 and 3. The plate circuit however in which the B battery 14 is located also includes the primary 22 of a suitable transformer, the secondary coil 23 of which is connected in series with two contact brushes 24, 24, working upon a two part commutator 25. Two other contact brushes 26, 26, engage this commutator and include a circuit in which is placed the galvanometer 15. With this particular arrangement light will fall on the photoelectric cell first from one lamp 2 and then the other 3 in quick succession. This produces a rapid succession of variations of current in the plate circuit of the amplifier. These variations of current give rise to an E. M. F. in the secondary 23 of the transformer, which is in one direction while the plate current is increasing, and in the opposite direction while the current is decreasing. The commutator 26 is carried on a shaft 19 of the disc 18 (as shown diagrammatically in Fig. 4) so that the galvanometer 15 will be first influenced by current resulting from the effect of the lamp 2 and alternately by current resulting from the effect of the lamp 3. Therefore if one light is stronger the galvanometer deflects in one direction, and if the other light is stronger it deflects in the opposite direction. Hence it is only necessary to move the comparison lamp 3 with respect to the scale 4 to give zero deflection and the scale will indicate the candle power of the lamp 2. The arrangement shown in Figs. 4 and 5 has the great advantage that, with the elimination from the galvanometer of the direct current in the plate circuit, the galvanometer has the same zero no matter what the value of the plate current is. Hence the adjustment of resistance to bring the galvanometer to zero is done away with entirely and any ordinary variations of the plate current or of the filament current of the amplifier do not have any influence on the result.

Having now described our invention, what we claim as new therein and desire to secure by Letters Patent is as follows:

1. In photometric apparatus, the combination with a photoelectric cell, a lamp to be measured, a standard comparison lamp, means for rapidly and in alternation permitting the light from the two sources to influence the photoelectric cell, one of said lamps being movable with respect to the cell, a thermionic valve, the grid electrode of which is in circuit with said photoelectric cell, means in the plate circuit for determining when the changes in grid potential caused by the light from each lamp are equal, and means for evaluating the candle power of the lamp to be metered through its relative position to that of the comparison lamp and the photoelectric cell.

2. In photometric apparatus, the combination with a photoelectric cell, a lamp to be measured, a standard or comparison lamp, and a rotating glass disc, one-half of which is a mirrored surface for alternately permitting light from the two sources to influence the cell, one of said lamps being movable with respect to the cell whereby the electric effects due to the sources of light may be balanced, substantially as set forth.

3. In photometric apparatus, the combination with a photoelectric cell, a lamp to be measured, a standard comparison lamp and a rotating glass disc, one half of which is a mirrored surface for alternately permitting light from the two sources to influence the cell, one of said lamps being movable with respect to the cell, whereby the electric effects due to the source of light may be balanced, and a thermionic valve for amplifying said effects, substantially as set forth.

4. In photometric apparatus, the combination with a photoelectric cell, a lamp to be measured, a standard comparison lamp, means whereby the light from the two sources may alternately and rapidly influence the cell, a three-electrode tube in whose grid circuit the photoelectric cell is located, a transformer the primary of which is located in the plate circuit of the thermionic tube, a galvanometer in the secondary of said transformer, and a commutator for alternately permitting the galvanometer to be influenced by the current controlled by the two light sources, respectively, substantially as set forth.

CLAYTON H. SHARP.
CARL KINSLEY.
EDGAR D. DOYLE.